United States Patent [19]

Blanchet et al.

[11] 3,787,824

[45] Jan. 22, 1974

[54] HIGH-DENSITY MAGNETIC MEMORY

[75] Inventors: Francis Blanchet, Bresson; Georges Sauron, Meylan, both of France

[73] Assignee: Commissariat A L'Energie Atomique, Paris, France

[22] Filed: Mar. 6, 1972

[21] Appl. No.: 232,033

[30] Foreign Application Priority Data

Mar. 4, 1971 France .............................. 71.07454

[52] U.S. Cl.340/174 DC, 340/174 PW, 340/174 GP, 340/174 TF

[51] Int. Cl........................... G11c 11/14, G11c 5/02

[58] Field of Search 340/174 PW, 174 DC, 174 GP, 340/174 TF

[56] References Cited

UNITED STATES PATENTS

| | | | |
|---|---|---|---|
| 3,602,635 | 8/1971 | Romankiw | 340/174 TF |
| 3,550,265 | 12/1970 | Rairden | 340/174 TF |
| 3,371,326 | 2/1968 | Fedde | 340/174 PW |

*Primary Examiner*—Stanley M. Urynowicz, Jr.

*Attorney, Agent, or Firm*—William B. Kerkam, Jr. et al.

[57] ABSTRACT

The memory comprises two orthogonal arrays of conductive elements and magnetic elements and a ground plane, the array of conductive elements being located between the array of magnetic elements and the ground plane at a distance from this latter which is such as to permit writing without any disturbance of information beneath the conductive element, while permitting a high memory-core density and low current consumption.

The method of fabrication of the memory consists in forming a substrate having a flat conductive face, in bonding to said face an insulator having a thickness equal to the distance aforesaid, in coating the insulator with adhesive material, in applying flat, parallel conductive elements on the adhesive material and in depositing parallel magnetic elements on the conductive elements at right angles thereto.

3 Claims, 9 Drawing Figures

HIGH-DENSITY MAGNETIC MEMORY

This invention relates to a high-density magnetic memory as well as to a corresponding method of fabrication which is primarily intended to be employed in memories of the type consisting of a magnetic film deposited on either flat or cylindrical lead-wires.

It is known that, in general, a magnetic memory is constituted by an array of magnetic elements formed of round or flat parallel wires coated with a layer of a magnetic substance and by an array of conductive elements, also formed of round or flat wires in parallel relation and disposed at right angles to those of the array of magnetic elements.

Writing of binary data on these magnetic elements is carried out by means of magnetic fields produced by the conductive elements and the magnetic elements. A "memory core" is represented by the intersection of a magnetic element with a conductive element. The magnetic elements constitute the digit leads (or bits) and the conductive elements are word leads.

In all cases, it is endeavored to construct magnetic memories which satisfy the following conditions:

1. The need to provide a high density of "memory cores" so as to reduce the propagation times and thus to obtain very short memory cycles.

2. The need to reduce to a minimum the disturbances caused at the level of a conductive element and within a magnetic element by the adjacent conductive elements (this condition is rather incompatible with the first).

3. The need for only a low current consumption within the conductive elements.

This invention makes it possible to satisfy these conditions by means of modifications which are made in a known arrangement of magnetic memories.

Among the magnetic memories of known types, there can first be mentioned those in which provision is made for a ground plane and flat word-drive leads in a printed circuit.

As shown diagrammatically in FIG. 1, these memory devices of known type are constituted by two arrays of perpendicular leads M and D. The digit leads D, which can be either round copper wires on which is deposited a magnetic layer of flat copper wires forming a sandwich with two magnetic layers formed of a nickel-iron alloy, for example, are placed between the word leads M and a ground plane $\omega$.

The coincidence of a current which passes through one of the words M with double-polarity currents which pass through the digits D in either one direction or in the other makes it possible to write 1 to 0 data at the points of intersection (memory cores) of the word with the digits by orientation of magnetization either in one direction or in the other.

Reading of information is carried out by collecting from the digit lines the flux which is produced by the word current alone.

The presence of the ground plate $\omega$ makes it possible to reduce the word current by increasing the magnetic field at the level of the magnetic material: in fact, the image lead M' of the word M (which is symmetrical with M with respect to the ground plane, produces a field having the same direction as the field generated by M.

The magnetic field H produced at a point P by a lead having a width $a$ which carries a current I is practically equal to $$H = 4\pi/10\ I/2a\ \theta/\pi$$

The field is therefore proportional in particular to the angle $\theta$ which subtends the lead (as shown in FIG. 2).

In order to produce a maximum field H in the digit leads D, it is therefore an advantage to bring the leads M and M' close to the magnetic material. This is possible in the case of the lead M which can be insulated from the digit lead by means of a small thickness but proves difficult in the case of the image lead M' as this latter is located at a distance from the magnetic material which is at least equal to three times the thickness of the insulating material in the event that the lead D is infinitely thin and that said lead is insulated from the leads M and from the ground plane by means of the same thickness. Whereas the angle $\theta_2$ is in the vicinity of $\pi$, the angle $'_2$ is not close to this value in the case of narrow leads (high density of word leads).

The disadvantage of this structure arises from the fact that each word $M_2$ is disturbed by its adjacent words $M_1$ and $M_3$ ($M_1$, not shown in FIG. 1, is symmetrical with $M_3$ with respect to $M_2$) at the moment of writing of these latter. In fact, the angles $\theta_1$, $\theta'_1$, $\theta_3$, $\theta'_3$ are not zero, with the result that the adjacent words produce a field at the level of the word $M_2$ when they are selected. The central word $M_2$, which must retain its information when writing is performed on adjacent words, is therefore put in the necessary state for writing with a low word current. Depending on the properties of the magnetic material (limiting curve of word disturbances for the writing digit current), the central bit is more or less disturbed. These disturbances become all the more marked as provision is made for a greater density of word leads. One means for reducing such disturbances while maintaining a high density is to cover the word leads with a substance which has high permeability and serves to localize the magnetic field beneath the word lead. This expedient is highly effective since this makes it possible both to reduce the word current and to reduce word-to-word disturbances. On the other hand, it proves difficult to carry this expedient into practical effect for purely technological reasons (the difficulty involved in obtaining material having high permeability and a weak residual field). Furthermore, there results a considerable increase in cross-talk between leads and consequently in the background noise of selection of words of the memory (increase in the word/digit intersection capacities, in the coupling inductances, and in the leakage current).

Among the known magnetic memories which can also be mentioned are the memories having word leads of enamelled wire arranged in loops (as shown in FIG. 3), these memories being described in French Pat. No. 1,592,004.

The method of fabrication of these memories consists in placing the magnetic wires within tunnels formed in the interior of an array of turns of enamelled wires which constitute the word loops.

Each word M is constituted by two turns arranged in series so that the word current which is necessary to obtain the same field is divided by two.

The word-to-word disturbances exist in the same manner as in the previous case. By way of example, in the case of a word having a width of 300 $\mu$ (distance between the two turns), the minimum word pitch required to have tolerable word-to-word disturbances is of the order of 1.2 mm.

The aim of this invention is to provide a high-density magnetic memory which is not subject to the defects mentioned above in connection with magnetic memories of the prior art.

More precisely, the invention relates to a magnetic memory of the type comprising two orthogonal arrays of conductive elements and magnetic elements and a ground plane, wherein said array of conductive elements is located between said array of magnetic elements and said ground plane.

In one advantageous form of construction of the memory according to the invention, said conductive elements are constituted by a plurality of turns in side-by-side relation which are mounted in series and said ground plane is constituted by a substrate having two flat parallel and conductive faces, the turns being wound around said parallel faces.

The invention also relates to a method of fabrication of said magnetic memory. Said method consists in forming a substrate having a flat conductive face, in applying by adhesion to said conductive face an insulator having a thickness equal to said distance as defined in the appended claim 1, in coating said insulator with adhesive material, in applying flat, parallel conductive elements to said adhesive material and in depositing on said conductive elements magnetic elements which are parallel to each other and perpendicular to said conductive elements.

Further properties and advantages of the present invention will become apparent from the following description in which different forms of construction of the memory according to the invention are given by way of explanation without any implied limitation, reference being made to the accompanying drawings, wherein:

FIGS. 1 and 3, as already defined in the foregoing, show diagrammatically two magnetic memories according to the prior art;

Figure 1:
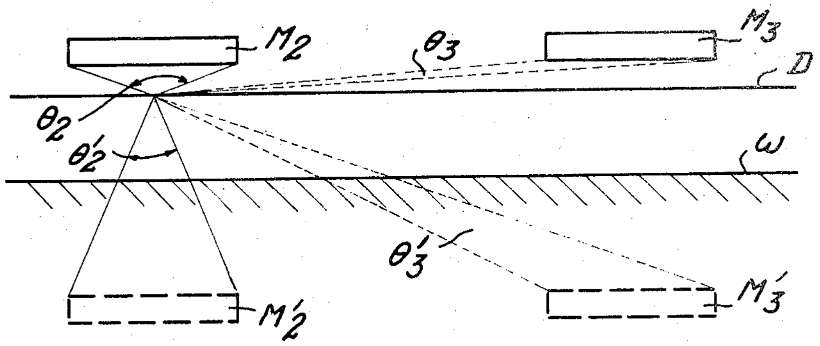
FIG.1 PRIOR ART
Figure 4:
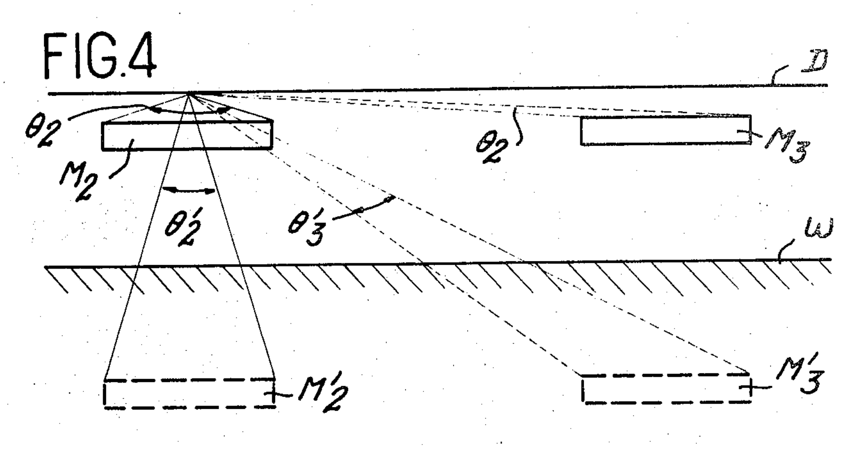
FIG. 4 shows diagrammatically a magnetic memory in accordance with the invention.
Figure 2:
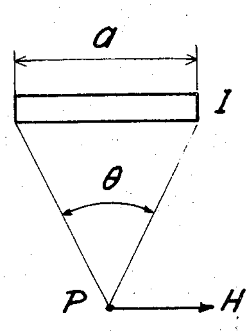
FIG. 2 is a diagram which is intended to illustrate the general formula of the magnetic field produced by a lead-wire.

The magnetic memory in accordance with the invention (as shown in FIG. 4) consists in placing the array of digit leads D (consisting of round magnetic wires or flat magnetic layers), not between the word leads M and the ground plane $\omega$, but outside the loop constituted by M and the image M′ of M. It is immediately apparent that, whereas the fields H and H′ were added in the preceding cases, they are deducted at the level of the magnetic material in this new arrangement. However, the ground plane $\omega$ is placed at a sufficient distance to ensure that the image lead M′ is "seen" from the magnetic material at a relatively small angle and that the field H′ is thus of small value in comparison with H (H′≈0.1 H).

The assembly in accordance with the invention (as shown in FIG. 4) has the advantage of considerably reducing the disturbances which, in magnetic memories of the prior art, were produced in one word by the adjacent words. In the example of this figure and by analogy with FIG. 3, the word leads are flat wires and the digit leads are also flat wires. However, the following explanations are valid for other shapes of wires.

In fact, whereas the field at the level of the central word $M_2$ (the word $M_1$, not shown in FIG. 4, is symmetrical with $M_3$ with respect to $M_2$) is modified to only a slight extent by its image $M'_2$ inasmuch as $\theta_2$ is much larger than $\theta'_2$, the fields produced by the adjacent words $M_1$ and $M_3$ at the level of the word $M_2$ are of the same order of magnitude as the fields produced by their images $M'_1$ and $M'_3$.

There exists an optimum distance *d* from the leads D to the ground plane $\omega$ at which the signal collected at the time of reading is of maximum value. If *d* is too small, the angle $\theta'_2$ is too large and the field produced by $M_2$ is not sufficient to cause rotation of magnetization beneath the word $M_2$; in that case, the signal is too weak as a result of a lack of field. If *d* is too great and the fields $H'_1$ and $H'_3$ are too weak to permit compensation for the fields $H_1$ and $H_3$ in the zone located beneath the word $M_2$, the signal decreases since it is disturbed by the adjacent words. This optimum distance *d* depends on the structure adopted for the fabrication of the memory. It will be seen hereinafter that said distance depends in particular on the width of the word lead.

In order to determine the performances of a memory core of the magnetic thin-film type, it is customary to plot the so-called S curve representing the reading signal S as a function of the digit current I*d* after a cycle of disturbances by the adjacent words.

Figure 5:
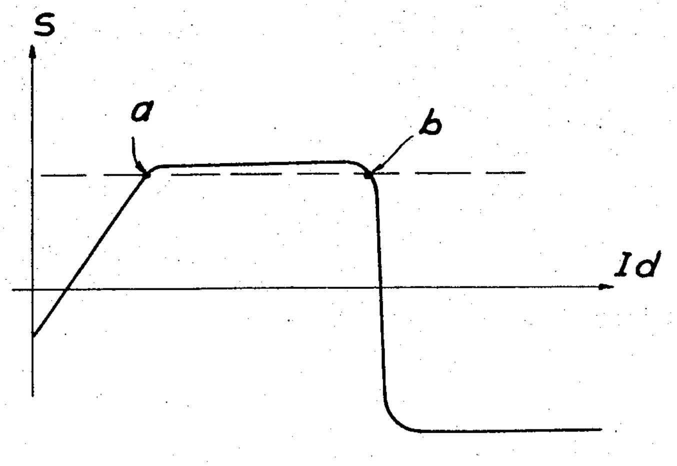
FIGS. 5 and 6 represent so-called S curves, each showing the variations of the reading signal S as a function of the digit current I*d;*

Three portions can be distinguished on this curve (shown in FIG. 5). The first portion on the left-hand side represents the limit of writing (point *a*) and corresponds to very weak digit currents which do not permit writing of information beneath the central word (weak signal in the case of low values of I*d*). The second portion, shown on the right-hand side, indicates the limit of disturbances (point *b*) and corresponds on the contrary to high digit currents; the signal assumes a reverse polarity corresponding to the opposite information written on the adjacent words. It is the combination of stray fields arising from adjacent words and of the writing field produced by I*d* which causes disturbance of the signal; the limit of disturbances depends on the amplitude of said stray fields. The third portion, shown at the center and usually flat, corresponds to the marginal range of digit current which can be employed for writing information in the memory core.

Figure 6:
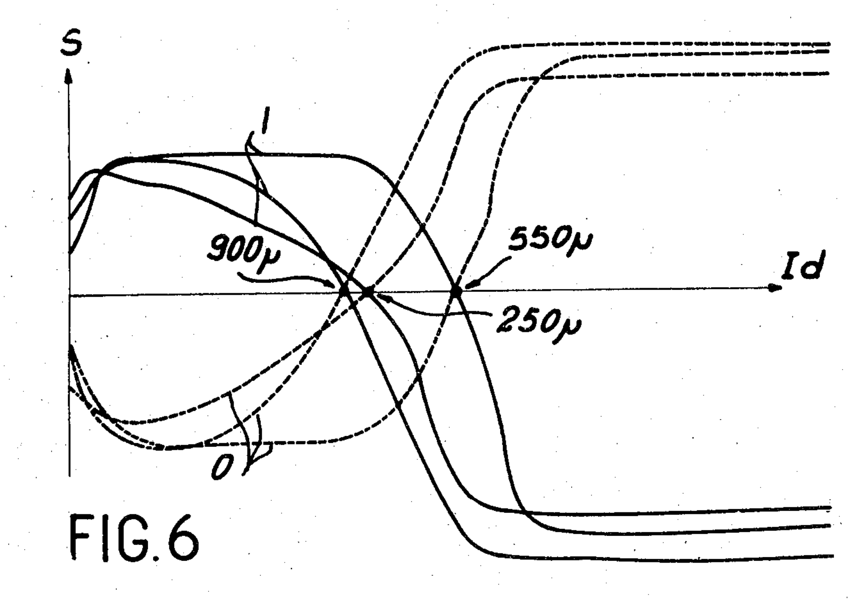

FIG. 6 shows a system of S-shaped curves which are deduced from the arrangement according to the invention. These curves correspond to distances *d* (between word leads and the ground plane $\omega$) having the values respectively of 900 $\mu$, 250 $\mu$ and 550 $\mu$. The word leads have a width of 300 $\mu$ and a pitch of 600 $\mu$, and the digit leads have a width of 100 $\mu$ (flat magnetic structure: flat digit lead of copper inserted as a sandwich between two layers of nickel-iron coupled magnetically along the easy axis of magnetization at right angles to the axis of the lead). The curves shown in continuous lines relative to writing of a 1 whilst the curves shown in dashed lines relate to the writing of a 0.

It is observed that the limit of disturbances (on the right-hand side) is displaced towards the left whilst $d$ increases and that, in the case of a distance of 900 $\mu$, it even reaches the limit of writing (marginal range of minimum digit current). On the contrary, in the case of 550 $\mu$, there is obtained a marginal range of maximum digit current. The curve obtained for a distance $d$ of 250 $\mu$ is also unfavorable ($d$ too small) and the signal decreases very rapidly when I$d$ increases.

Figure 7:
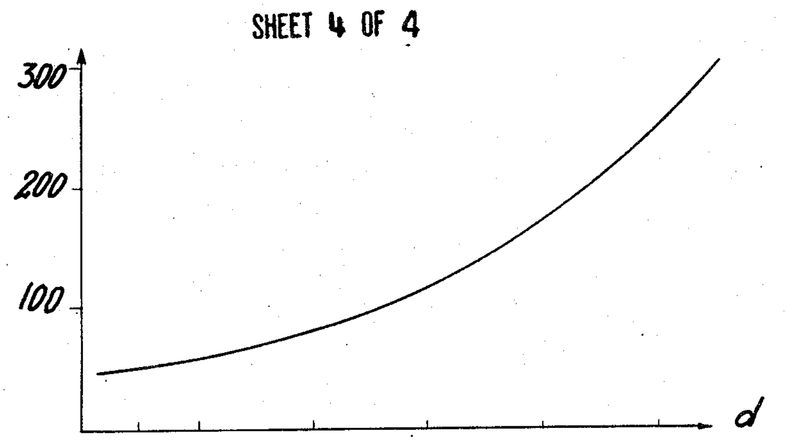
FIG. 7 shows the curve of variation in width of a word lead as a function of the optimum distance between said lead and the ground plane.

Experimentally, and in the case of a given structure, there consequently does in fact exist an optimum distance $d$ (550 $\mu$ in the case of FIG. 6) at which the disturbing fields are practically reduced to zero. Moreover, this optimum distance $d$ is proportional to the width of the word. This is expressed in the graph of FIG. 7, in which the width of the word is plotted as ordinates and the distance $d$ is plotted as abscissae.

On the basis of these criteria, the device according to the invention increases the density of the words without increasing the word-to-word disturbances.

In order to demonstrate the advantage of the device in a more familiar field of utilization, a test has been performed with a round magnetic wire having a diameter of 135 $\mu$.

Figure 3:
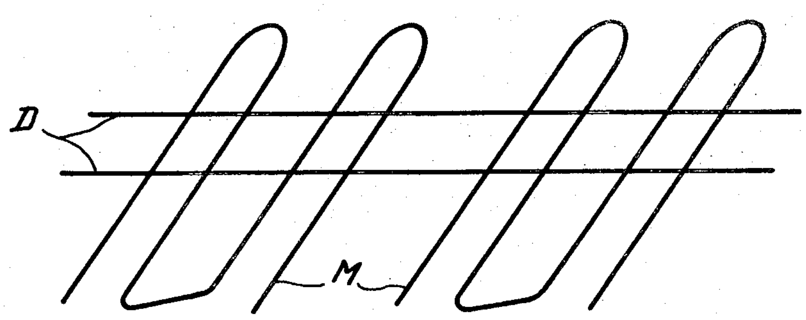
FIG. 3 PRIOR ART

Identical results (amplitude of signal and marginal range of digit current) have been obtained with the structure having a word pitch of 600 $\mu$ (0.6 mm) and with the structure illustrated in FIG. 3, in which the word pitch is 1.27 mm; this accordingly represents a gain of 2:1 in the word density.

The arrangement in accordance with the invention (as illustrated in FIG. 4) offers a further practical advantage. Whereas it is the practice in the usual structures (of the type shown in FIG. 3) to insert the magnetic wire into tunnels of small size, which is a difficult and very delicate operation in the case of magnetic wires of small diameter, it is only necessary in the case of the invention to lay the magnetic wires on the structure constituted by the ground plane, the insulator and the layer of word leads. This results in a saving of time and higher efficiency of the operation involved in positioning magnetic wires, which require to be handled with care. Consideration can even be given to the use of wires of smaller diameter (50 $\mu$) which are very difficult to insert in tunnels by reason of their small rigidity. This results in a further gain in density of digit leads. However, the memory according to the invention (as shown in FIG. 4) has the disadvantage of entailing substantial word currents which are twice as high as a structure of the type involving word-field doubling by image effect or of the type comprising two loops of enamelled wires in series (shown in FIG. 3).

Figure 8:
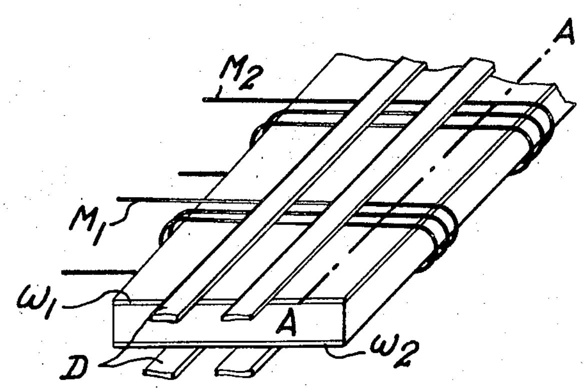
FIG. 8 illustrates an advantageous alternative embodiment of the memory according to the invention.

An alternative form of construction of the memory according to the invention (as shown in FIG. 8) makes it possible to circumvent the disadvantage just mentioned.

In this alternative embodiment, the words ($M_1$, $M_2$) are constituted by a plurality of turns of enamelled lead-wire placed in adjacent relation and in series, said turns being wound around two parallel ground planes ($\omega_1$ $\omega_2$).

The leads which are placed in side-by-side relation so as to form the word can be assimilated with a flat conductor of identical width. Optimization of the distance between these leads and either one or the other of said ground planes is identical in its general principle with the optimization previously obtained. If $n$ is the number of turns of each word ($M_1$, $M_2$), the word current required to obtain a field which is identical with the field produced by a flat conductor having the same width is $n$ times smaller in the most favorable case. In practice, in the case of $n = 3$ and juxtaposed wound wires having a diameter of 100 $\mu$, the current which is necessary in order to obtain, at the time of reading, the same signal as a flat conductor having a width of 300 $\mu$ is approximately divided by two, taking into account the fact that the word-current rise time is slightly longer in the first case on account of the inductance possessed by the three turns in series (the signal is in fact proportional to the word-current rise time). It should be pointed out that the second face of the structure is identical with the first and can be employed for the purpose of placing thereon a second layer of digit leads D which serve to carry the information (see FIG. 8).

In this case, the density of the memory is evidently doubled. A further very important advantage is provided by the second ground plane in that it permits easy construction of this alternative form.

The word leads can very readily be constituted by printed circuits with metallized holes for putting the loops in series. However, when densities of ten leads per millimeter are attained, the winding is much easier and does not call for intermediate soldered joints in order to connect the $n$ loops in series.

Figure 9:
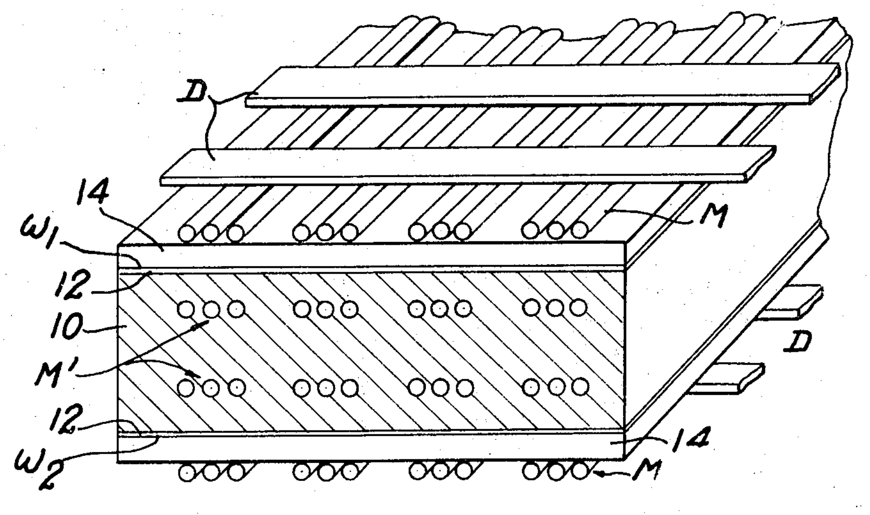
FIG. 9 is a sectional view taken along line A-A of FIG. 8.

FIG. 9, which is a sectional view along the line A—A of FIG. 8, shows a method of fabrication of this alternative embodiment of the invention.

The substrate 10 can be constituted by a laminate of epoxy resin coated with copper on both faces, for example a laminate having a thickness of 1.6 mm or 5 mm covered on both faces with a copper laminate 12 having a thickness of 35 $\mu$ (these substrates being commonly employed in the fabrication of printed circuits). The ground planes $\omega_1$ and $\omega_2$ are thus obtained.

An insulator 14 consisting, for example, of an epoxy resin laminate or of a kapton foil having a thickness equal to the optimum distance $d$ between the conductive elements M and the ground planes $\omega_1$ and $\omega_2$, is bonded to the two copper-coated faces aforesaid with araldite glue by pressing in the hot state, for example.

A double-face adhesive fabric is applied to the insulator 14 of each of the two ground planes $\omega_1$ and $\omega_2$; enamelled lead-wire is then wound thereon and remains stuck on the adhesive fabric. Thermo-adhesive enamelled wire can also be wound directly on the insulator and then caused to adhere thereto as a result of an annealing operation in a furnace or alternatively by dipping in alcohol.

In order to carry out the winding operation, the substrate is fixed on the mandrel of a winding machine. This mandrel can be disengageable or, in other words, can remain motionless while the motor of the winding machine continues to rotate and its wire guide continues to advance. It is thus possible either to wind in the normal manner $n$ turns having a pitch $p$ when the mandrel is engaged or to displace the wire by an amount equal to a whole number of the value of the pitch $p$ when the mandrel is disengaged.

Advantageously, it is possible to wind ($n$+1) turns per group instead of $n$, to cut the enamelled wire between the groups of turns and to unwind one turn each time in order that $n$ turns per group may again be obtained but with free wire available for the purpose of connecting-up the two wires of each group for the printed circuit which carries the electronic system for selecting the word leads.

It then remains to deposit or to bond the magnetic elements D at right angles to the conductive elements on both faces.

M' represents the images of the turns with respect to the ground plane $\omega_1$ and $\omega_2$, that is to say the images of the conductive word elements M.

What we claim is:

1. A high-density magnetic memory comprising an array of conductive word elements and magnetic elements and a ground plane, said array of conductive elements being located between said array of magnetic elements and said ground plane, the ratio of the width of the word elements to the distance between said array of conductive elements and said ground plane being substantially proportional to 300/550 to ensure that the algebraic sum of the magnetic field produced by a conductive element and of the magnetic field produced by the image of said conductive element with respect to the ground plane is of sufficiently high value to permit writing of information and sufficiently small to ensure that the algebraic sum of the magnetic field produced by the adjacent conductive element and of the magnetic field produced by the image of said adjacent conductive element with respect to the ground plane is of sufficiently low value to prevent any disturbance of this information beneath said conductive element.

2. A magnetic memory as defined in claim 1 wherein, said conductive elements are constituted by a plurality of turns of conductive enamelled wire in side-by-side relation mounted in series and 3. A magnetic memory as defined in claim 2, wherein said ground plane is constituted by a substrate having two flat parallel and conductive faces, the turns being wound around said parallel faces, and wherein an array of magnetic elements is provided for each of said two flat parallel faces.

* * * * *